E. N. ROTH.
HOSE COUPLING.
APPLICATION FILED MAR. 25, 1919.
1,346,424.
Patented July 13, 1920.
4 SHEETS—SHEET 1.
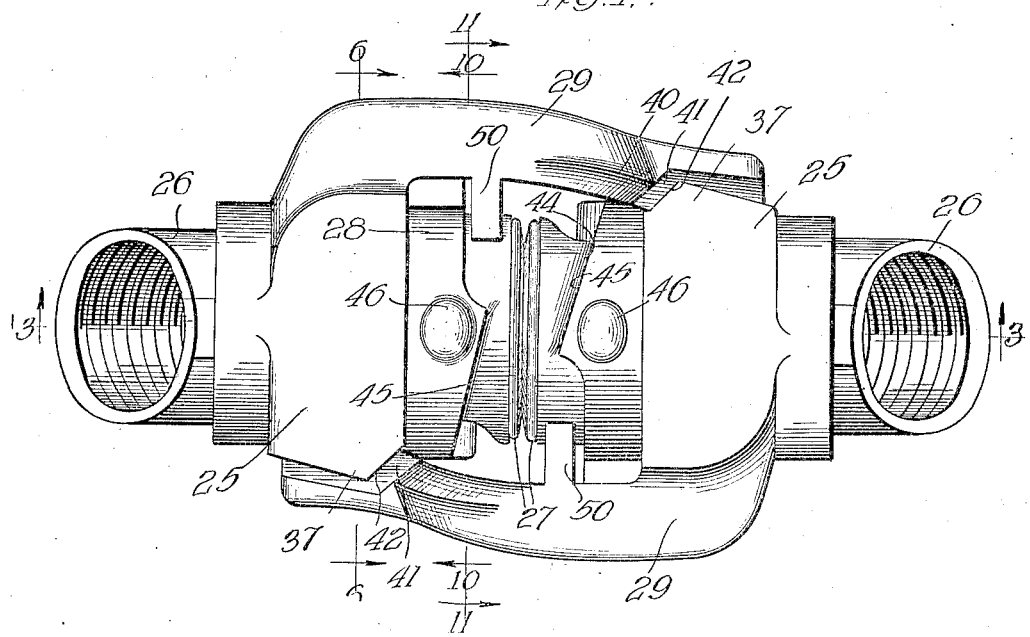
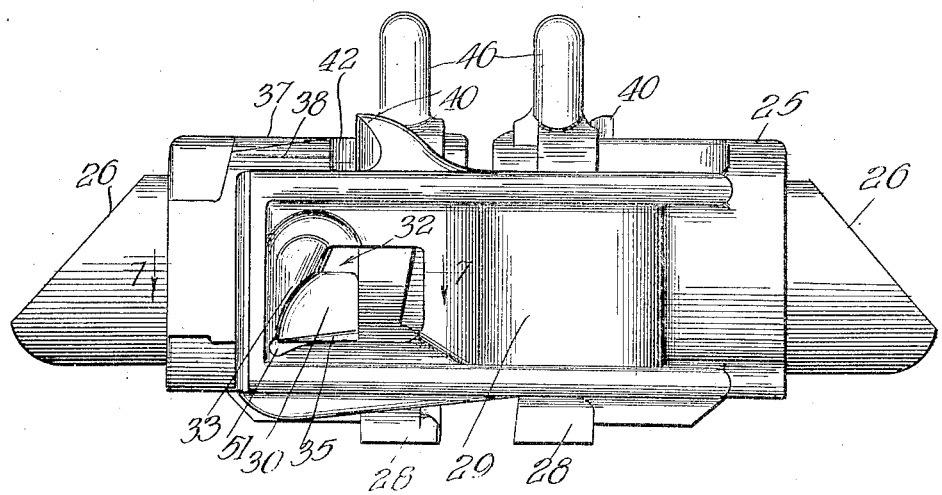

E. N. ROTH.
HOSE COUPLING.
APPLICATION FILED MAR. 25, 1919.

1,346,424. Patented July 13, 1920.
4 SHEETS—SHEET 2.

Witnesses:
Harry R. L. White
W. F. Kilroy

Inventor
Edward N. Roth
By Barnett & Trueman
Attys.

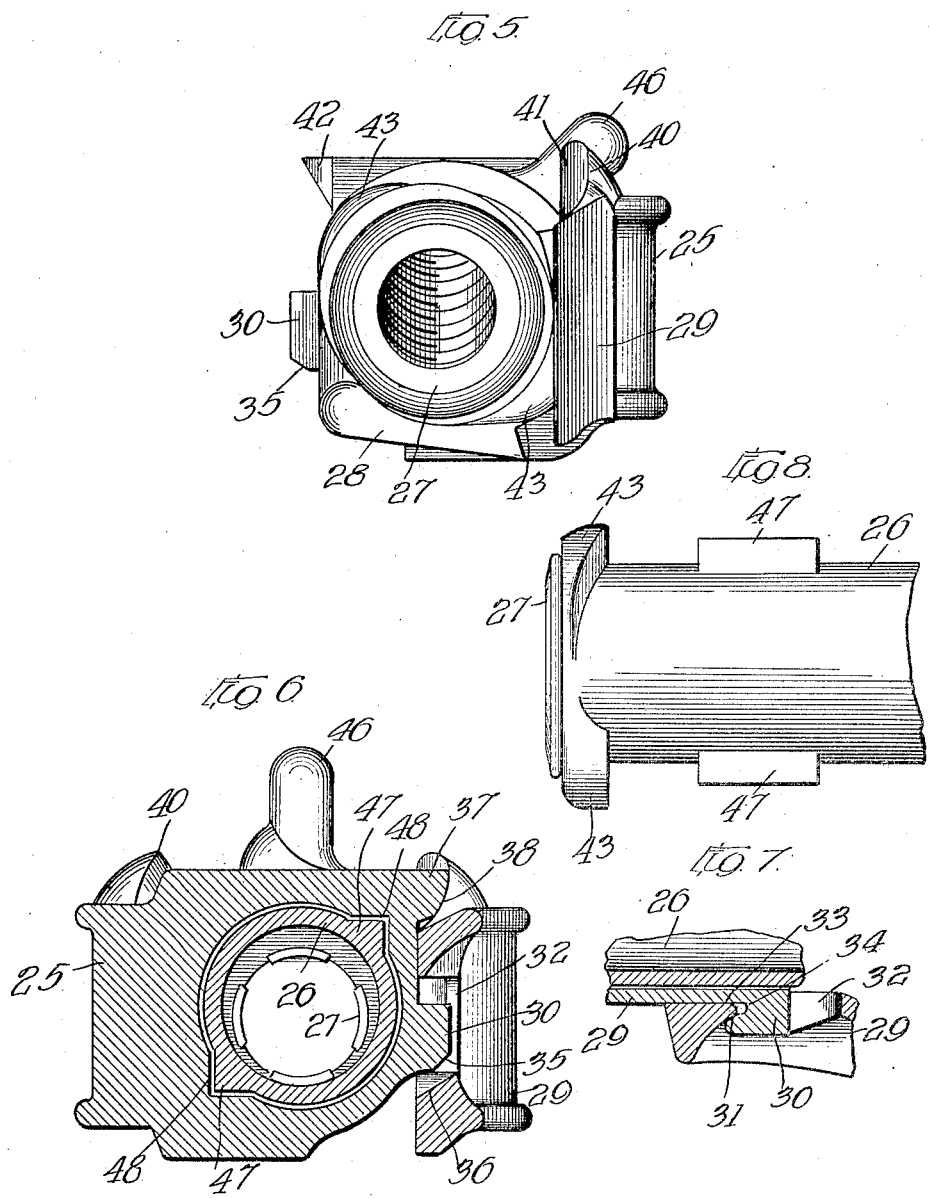

E. N. ROTH.
HOSE COUPLING.
APPLICATION FILED MAR. 25, 1919.
1,346,424.
Patented July 13, 1920.
4 SHEETS—SHEET 4.
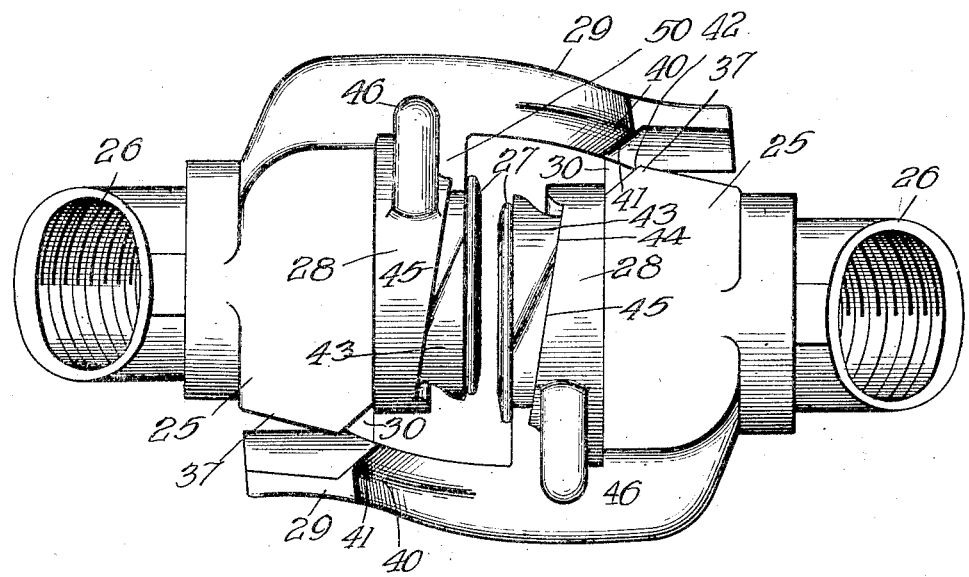
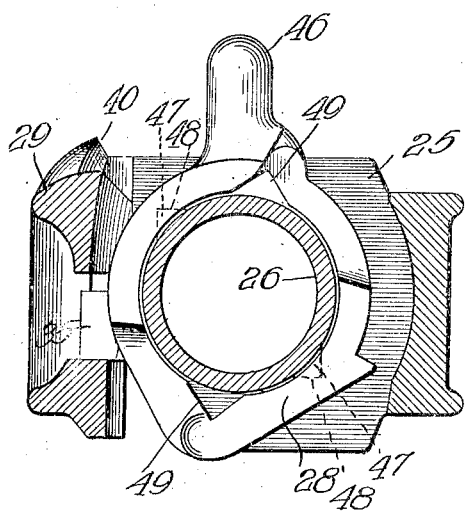
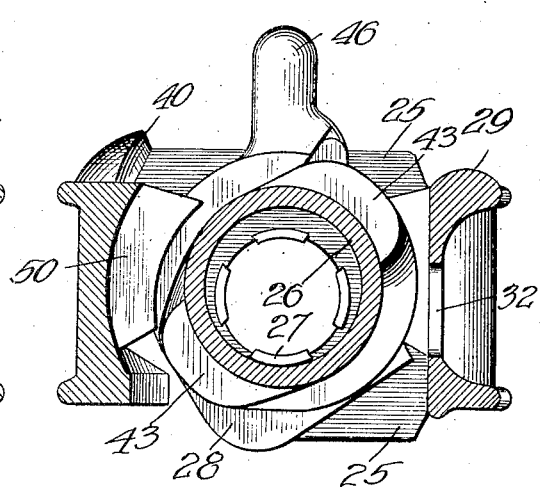
Witnesses
Harry R. L. White
W. P. Kilroy
Inventor
Edward N. Roth
By Barnett & Newman Attys

UNITED STATES PATENT OFFICE.

EDWARD N. ROTH, OF CHICAGO, ILLINOIS, ASSIGNOR TO ROTH MANUFACTURING COMPANY, OF CHICAGO, ILLINOIS, A CORPORATION OF ILLINOIS.

HOSE-COUPLING.

1,346,424.  Specification of Letters Patent.  Patented July 13, 1920.

Application filed March 25, 1919. Serial No. 284,958.

*To all whom it may concern:*

Be it known that I, EDWARD N. ROTH, a citizen of the United States, residing at Chicago, in the county of Cook and State of Illinois, have invented certain new and useful Improvements in Hose-Couplings, of which the following is a specification.

My invention relates to a hose coupling, more particularly to a hose coupling suitable for railway service, and the principal object of the invention is to provide certain improvements in the type of coupling described and claimed in the applications of Edward A. Russell and Seelye P. Harriman filed January 24, 1916, Serial No. 73,885, and July 24, 1916, Serial No. 110,873.

A coupling of this sort is composed of a pair of identical mating couplers (which, however, may be mated with any standard coupler of the straight port gravity type) each coupler comprising a conduit member secured to the hose or other pipe connection, a coupling member through which the conduit member extends and which is provided with means for engaging the mating coupler, a gasket associated with the conduit member adapted to bear against the gasket of the other coupler, and a wedging member or cam ring for forcing the conduit member and its gasket against the corresponding portion of the mating coupler. My invention seeks to simplify the construction of the coupler, as described and claimed in the applications above referred to, to reduce its weight, and to provide certain other improvements facilitating the manipulation of the device in coupling and uncoupling and insuring a steam tight joint between the gasket thereof and the gasket of the mating coupler, as will hereafter appear.

The invention is illustrated, in a preferred embodiment, in the accompanying drawings wherein—

Figure 1 is a plan view of a pair of couplers constructed in accordance with my invention shown in coupled engagement.

Fig. 2 is a side elevation of the same.

Fig. 5 is a view, in elevation, of the forward or inner face of the coupler.

Fig. 6 is a cross sectional view on line 6—6 of Fig. 1.

Fig. 7 is a fragmentary sectional plan on line 7—7 of Fig. 2.

Fig. 8 is a fragmentary side view of the conduit member of the coupler.

Fig. 9 is a plan view of a pair of couplers illustrating the way in which they are brought together and separated, and Figs. 10 and 11 are sectional views on the line designated 10—10, 11—11 of Fig. 1, these views being taken from opposite directions as indicated by the arrows.

Like characters of reference designate like parts in the several figures of the drawings.

Figure 3:
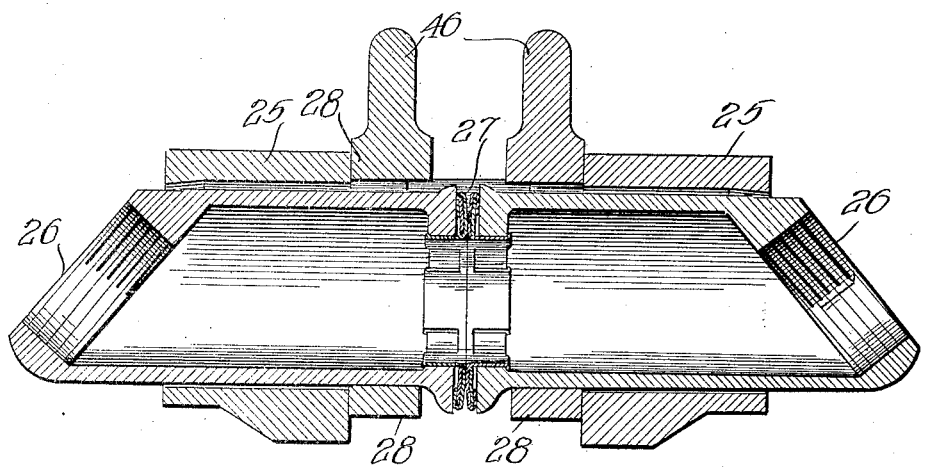
Fig. 3 is a sectional view on line 3—3 of Fig. 1.
Figure 4:
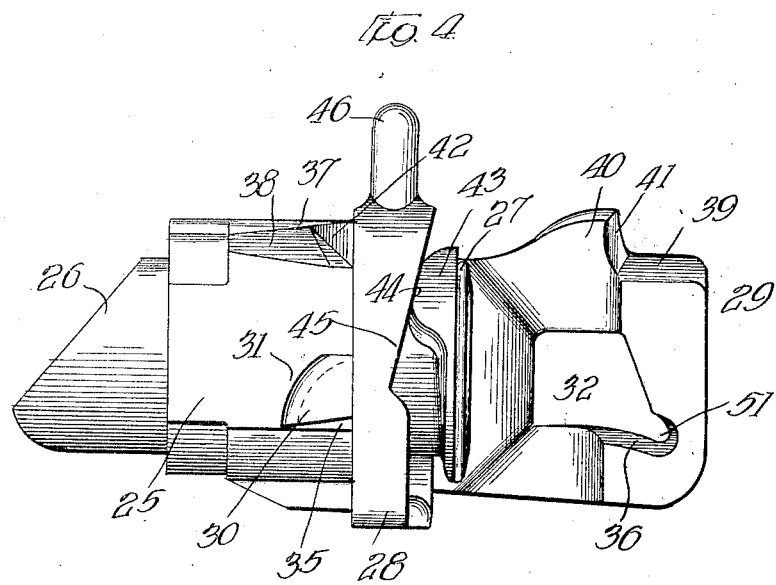
Fig. 4 is a view, in elevation, of one of the couplers showing the side having the locking lug.

The pair of couplers shown in Figs. 1, 2, 3, 6 and 8 are of identical construction but it will be understood that the couplers may be operatively engaged not only with couplers of their own construction but with any of the standard straight port, gravity couplers, (such as the "Chicago" and the "Safety" couplers) employed at the present time for making the connection between the steam train pipes of railway cars.

Each coupler consists of a coupling member 25, a conduit member 26 adapted to be attached to a hose or other pipe connection, a gasket 27, of any suitable type, at the forward end of the conduit member, and a revoluble wedge member 28 interposed between the parts of the conduit and coupling members for the purpose of producing relative longitudinal movement between said members. The coupling member 25 is provided with an arm 29 adapted to engage a locking lug 30 on the head of the other coupler member. Preferably the lug 30 is formed with a curved undercut edge 31 (Fig. 7) and the arm has an opening 32, the metal at the forward edge 33 of the opening being thinned down to engage the groove 34 formed by undercutting the edge of the lug. The bottom surface 35 of the lug 30 is beveled both transversely and longitudinally of the coupler, and the arm 29 of the mating coupler is provided with a correspondingly beveled surface 36 at the forward corner of opening 32. On the head above lug 30 is a projection 37, the under surface 38 of which is beveled. The projection 37 is adapted to stand over the arm 29, the upper edge of which is beveled at 39 to correspond generally to the bevel of surface 38. The arm is provided at its upper edge with an upstanding projection 40 having an oblique surface 41 adapted to bear against a surface 42 of corresponding angularity formed by cutting off the forward corner of projection 37.

The forward end of the conduit member 26 is formed with a pair of diametrically arranged lugs 43 having wedging faces 44. These lugs are disposed substantially midway between vertical and horizontal lines through the conduit member and their wedging surfaces 44 are adapted to be engaged by wedging surfaces 45 formed on the revoluble wedging member or cam ring 28, the latter being provided with a handle 46.

Any suitable form of gasket might be employed. The form of gasket shown and designated 27 is not claimed herein, as it is covered by my application for patent, Serial No. 283,291 filed March 18, 1919.

The conduit member 26 is formed with a pair of diametrically arranged longitudinal ribs 47 which fit in correspondingly formed grooves 48 in the coupler member. In order to permit the parts of the coupler to be assembled the cam ring 28 is formed on its inner surface with a pair of notches 49 which, for any normal position of the ring, are out of line with the ribs 47 on the conduit member, but which can be alined with said ribs for the purpose of assembling or disassembling the parts of the device. The cam ring lies behind a web 50 formed on the inner side of the locking arm 29. The forward lower corner of opening 30 in the locking arm 29 is cut out as shown at 51 to eliminate any possibility of binding when the couplers are uncoupled.

Operation: The couplers are brought together by a sidewise movement of one toward the other without the rocking movement characteristic of the ordinary gravity or Sewall type of coupler. The rocking of the couplers in coupling and uncoupling is undesirable because it bends the hose and thereby shortens their life, and because it tends to mutilate the gaskets. The trainman, after hooking each coupler arm over the locking lug on the head of the other coupler, which is done with the conduit members retracted, allows the couplers to drop. They will not fall apart. The undercut edge of the locking lug will merely ride up a little on the edge of the arm at the forward side of the openings in the arm. The engagements of the beveled surfaces 41 with the beveled surfaces 42 holds the coupling members in substantially their normal relationship so that the conduit members will be in alinement. These surfaces coöperate with the locking cams to make the engagement of the coupler heads quite stable even while the conduit members are retracted. This leaves the trainman's hands free to manipulate the cam rings. The rings are rotated by handles 46 until a tight fit is made between the gaskets of the two couplers. The conduit members pass loosely through the coupling members and inasmuch as the lugs 43 on the conduit members are disposed on a line oblique to the vertical, the lugs being substantially half way between the vertical and horizontal position, the points of thrust against one conduit member are substantially at right angles to the points of thrust against the other member with the result that the gasket faces can be made to press one against the other.

To uncouple the coupling the cam rings are rotated in a direction reverse to that above indicated. The coupling members, however, remain engaged after the conduit members are retracted. If the train pipe contains any steam it cannot escape through the gap between the gaskets before the trainman handles the coupler. The cam rings may be opened with a hammer or other tool if the coupler is hot or if the train pipe is likely to contain steam. The coupling members are disengaged by pressing them upwardly. This can also be done, if need be, by a tool or the like. The beveled surfaces 41, 42, and the beveled surfaces 35, 36, facilitate the disengagement of the couplers. The engagement of these beveled or wedging surfaces tends to raise the locking lug out of the corner of opening 30 and then force the lug inwardly or the locking arm outwardly, which amounts to the same thing.

1 claim:

1. A hose coupler comprising, in combination, a coupling member provided with means for engaging a mating coupler, a conduit member extending through the coupling member, and a wedging member interposed between the coupling and the conduit member, the conduit and wedging member being formed with two pairs of coengaging wedging faces disposed substantially midway between vertical and horizontal lines through the conduit member.

2. A hose coupler comprising, in combination, a coupling member provided with means for engaging a mating coupler, a conduit member extending through the coupling member, and a revoluble wedging member interposed between the coupling and the conduit member, the conduit and wedging member being formed with two pairs of coengaging wedging faces disposed substantially midway between vertical and horizontal lines through the conduit member.

3. A hose coupler comprising, in combination, a coupling member provided with means for engaging a mating coupler, a conduit member extending through the coupling member, and means for forcing the conduit member through the coupling member, which means has bearings against one of said members only at points substantially midway between vertical and horizontal lines through the coupling member.

4. A hose coupler comprising, in combination, a coupling member provided with means for engaging a mating coupler, a conduit member extending through the coupling member, and means for forcing the conduit member through the coupling member, which means has bearings against the conduit member only at points substantially midway between the vertical and horizontal lines through the coupling member.

5. A hose coupler comprising, in combination, a coupling member provided with means for engaging a mating coupler, a conduit member extending through the coupling member and provided at its outer end with a pair of lugs diagonally arranged with respect to a vertical line through the conduit member, and a revoluble wedging member interposed between the coupling member and said lugs.

6. A hose coupler comprising, in combination, a hollow coupler head having an arm for engaging the side of a mating coupler head, a conduit member extending through the head and provided at its inner end with a pair of lugs disposed diametrically approximately midway between vertical and horizontal lines through the conduit member, and a cam ring bearing against the face of the coupler head, surrounding the conduit member and having wedging surfaces to bear against said lugs.

7. In combination, a pair of mating couplers each comprising a coupler head and an arm projecting therefrom adapted to lie along the side of the head of the other coupler, a conduit member in one of the heads, and means for moving the same longitudinally therethrough, and a locking lug on each of said coupler heads having a curved, undercut edge adapted to be engaged by the arm of the other coupler, the under surface of said lug being beveled both longitudinally and transversely of the coupling and the arm of the coupler having a surface correspondingly beveled to engage with the beveled surface on the lug.

8. In combination, a pair of mating couplers each comprising a coupler head and an arm projecting therefrom adapted to lie along the side of the head of the other coupler, a conduit member in one of the heads, and means for moving the same longitudinally therethrough, and a locking lug on each of said coupler heads having a curved, undercut edge adapted to be engaged by the arm of the other coupler, the under surface of said lug being beveled both longitudinally and transversely of the coupling and the arm of the coupler having a surface correspondingly beveled to engage with the beveled surface on the lug, and the upper portions of the heads and arms being formed with coengaging diagonally disposed surfaces, substantially as described.

9. A hose coupler comprising, in combination, a coupling member, a conduit member extending through the coupling member, means for imparting longitudinal movement to the conduit member, and means for engaging the coupling member with a mating coupler comprising a wedging surface which tends, if the conduit member be withdrawn from contact with the mating coupler, to effect the disengagement laterally of the couplers when upward pressure is brought to bear against the under side of the coupling.

10. A hose coupler comprising, in combination, a coupling member consisting of a hollow head and a locking arm projecting from one side of the head, a conduit member extending through the coupling member, means for imparting longitudinal movement to the conduit member, and means for engaging the locking arm of the coupler with a mating coupler comprising a wedging surface which tends, if the conduit member be withdrawn from contact with the mating coupler, to effect the disengagement laterally of the couplers when upward pressure is brought to bear against the under side of the coupling.

11. A hose coupler comprising, in combination, a hollow coupler head formed on one side with a forwardly projecting arm having an opening therein and on the other with a locking lug having a curved undercut edge on one side and with a beveled surface on its under side, the locking arm being formed on the lower forward corner of the opening with a beveled surface, and means for driving the conduit member through the coupling member.

12. A hose coupler comprising, in combination, a hollow coupler head formed on one side with a forwardly projecting arm having an opening therein and on the other with a locking lug at the bottom of the head and with a lateral projection at the top of the head, the forward corner of which is beveled, the locking arm being formed at the top with a projection having a diagonally disposed wedging face and at the forward lower corner of the opening with a longitudinally and transversely beveled surface, and the locking lug being formed with a curved undercut edge at one side and with its under surface beveled longitudinally and transversely, substantially as described.

13. A hose coupler comprising a coupling member, a conduit member extending through the coupling member, means for forcing the conduit member against the mating coupler, and means for providing an engagement with a mating coupler of similar character which engagement will be stable even while said conduit member is retracted, comprising a locking lug and means to coöperate with a similar lug on the mating coupler member and surfaces at the top of the coupler member to engage similar surfaces on the mating member.

14. A hose coupler comprising a coupling member, a conduit member extending through the coupling member, means for forcing the conduit member against the mating coupler, and means providing engagement with a mating coupling member of similar character which engagement will be stable even while said conduit member is retracted, comprising a locking lug and means to coöperate with a similar lug on the mating coupling member, and wedging surfaces near the top of the coupling member to engage similar surfaces on the mating member.

15. A hose coupler comprising a coupler member, a conduit member extending through the coupler member, means for forcing the conduit member against the mating coupler, and means for providing an engagement with a mating coupler member of similar character which engagement will be stable while said conduit member is retracted, comprising a locking lug and means to coöperate with a similar lug on the mating coupling member, and a lateral projection and an upstanding projection at the top of the coupling member, on opposite sides thereof, adapted to bear against the corresponding parts of the mating coupling member.

16. A hose coupler comprising a coupling member formed at one side with a forwardly projecting arm having an arcuate locking edge and at the other side with an undercut arcuate locking lug, a conduit member movable longitudinally through the coupling member, means for forcing the conduit member toward the mating coupler, a lateral projection at the upper edge of the coupling member on the side having the locking lug and an upstanding projection on the other side of the coupling member adapted to bear against the mating coupling member.

17. A hose coupler comprising a coupling member formed at one side with a forwardly projecting arm having an opening therethrough and an arcuate edge along the said opening, said member being provided on the other side with an undercut arcuate locking lug, a conduit member movable longitudinally through the coupling member, means for forcing the conduit member toward the mating coupler, a lateral projection at the upper edge of the conduit member on the side having the locking lug, the forward corner of which is beveled off, and an upstanding lug on the other side of the coupling member the front face of which is beveled so that said projection and upstanding lug may engage corresponding parts on a mating coupler to hold the couplers in alinement substantially as described.

18. A hose coupling comprising in combination a pair of coupling members, conduit members extending through the coupling members, and means for forcing the conduit members into contact with each other; said coupling members being formed with a plurality of coengaging surfaces oblique to the longitudinal axis of the coupling, whereby the coupling members are held in stable engagement, with the conduit members alined one with the other, even while the latter are retracted.

19. A hose coupling comprising in combination a pair of coupling members, conduit members extending through the coupling members, and means for forcing the conduit members into contact with each other; said coupling members being formed with a plurality of coengaging surfaces oblique to the longitudinal axis of the coupling, whereby the coupling members are held in stable engagement, with the conduit members alined one with the other, even while the latter are retracted, which surfaces are so disposed as to effect a disengagement of said coupling members when upward pressure is exerted against the bottom of the coupling with the conduit members retracted.

20. A hose coupling comprising in combination a pair of coupling members each formed with a forwardly projecting arm at one side thereof and with a locking device on the other side to engage the arm of the mating coupling member, conduit members extending through the coupling members, and means for forcing the conduit members into contact with each other; said coupling members being formed with a plurality of coengaging surfaces whereby the coupling members are held in stable engagement, with the conduit members in alinement with each other, even while the latter are retracted, said surfaces being oblique to the longitudinal axis of the coupling and certain of them disposed so as to effect a disengagement of said coupling members when upward pressure is exerted against the bottom of the coupling, with the conduit member retracted.

21. A hose coupler comprising a coupling member, a conduit member movable back and forth with respect to the coupling member, means on this coupling member for providing engagement with a mating coupling member whereby said members are held in normal alinement and against movement toward each other, and means for forcing said conduit member against the corresponding part of the other coupler.

EDWARD N. ROTH.